(12) United States Patent
Wobben

(10) Patent No.: US 6,592,331 B1
(45) Date of Patent: Jul. 15, 2003

(54) REINFORCEMENT RING FOR THE TOWER OF AN WIND ENERGY FACILITY

(76) Inventor: Aloys Wobben, Argestrasse 19, Aurich D-26607 (DE)

(*) Notice: Subject to any disclaimer, the term of this patent is extended or adjusted under 35 U.S.C. 154(b) by 0 days.

(21) Appl. No.: 09/979,289
(22) PCT Filed: May 19, 2000
(86) PCT No.: PCT/EP00/04527
§ 371 (c)(1), (2), (4) Date: Mar. 18, 2002
(87) PCT Pub. No.: WO00/71856
PCT Pub. Date: Nov. 30, 2000

(30) Foreign Application Priority Data

May 20, 1999 (DE) .......................... 199 23 165

(51) Int. Cl.⁷ ............................. F01D 25/00
(52) U.S. Cl. .............. 416/244 R; 415/4.3; 290/44; 248/224.8
(58) Field of Search ............... 416/244 R, 246, 416/204 R; 415/4.3, 4.5; 290/44, 55; 248/224.8

(56) References Cited

U.S. PATENT DOCUMENTS

| 7,412 A | * | 6/1850 | Fisher |
| 3,180,570 A | * | 4/1965 | Grabowski |
| 5,333,436 A | * | 8/1994 | Noble ................. 52/726.3 |
| 5,687,537 A | * | 11/1997 | Noble ................. 52/726.3 |
| 6,470,645 B1 | * | 10/2002 | Maliszewski et al. ...... 52/45.18 |

FOREIGN PATENT DOCUMENTS

| DE | 3718436 A1 | 12/1988 |
| DE | 19621514 A1 | 12/1997 |
| EP | 0821161 A1 | 1/1998 |
| JP | 05321482 | 12/1993 |
| SU | 898027 | 1/1982 |
| WO | WO 82/04466 | 12/1982 |

OTHER PUBLICATIONS

Hau, Reich, "Windkraftanlagen", *Springer Verlag*: 374–391, Aug. 22, 2000.

* cited by examiner

Primary Examiner—Edward K. Look
Assistant Examiner—James M McAleenan
(74) Attorney, Agent, or Firm—Seed IP Law Group PLLC

(57) ABSTRACT

The present invention concerns a tower of a wind power installation for carrying a tower head of the wind power installation, comprising a flange for receiving a connection which is suitable for receiving the tower head of the wind power installation.

Therefore the object of the invention is to provide a tower of a wind power installation having a flange for receiving a connection, wherein the tower does not suffer deformation in respect of its cross-section, in particular in the region of the flange, by virtue of the inherent weight of the tower, during manufacture and/or transport.

A tower of a wind power installation for carrying a tower head of the wind power installation, comprising a flange for receiving a connection which is suitable for receiving the tower head of the wind power installation, characterised in that there is provided a partition or a ring bulkhead in the tower interior at a spacing of between preferably 1.0 m and 7.0 m from the flange, and the partition or the ring bulkhead substantially forms a disc which is connected to the tower wall in the tower interior and passes through the tower.

6 Claims, 10 Drawing Sheets

REINFORCEMENT RING FOR THE TOWER OF AN WIND ENERGY FACILITY

The present invention concerns a tower of a wind power installation for carrying a tower head of the wind power installation, comprising a flange for receiving a connection which is suitable for receiving the tower head of the wind power installation.

Figure 1:
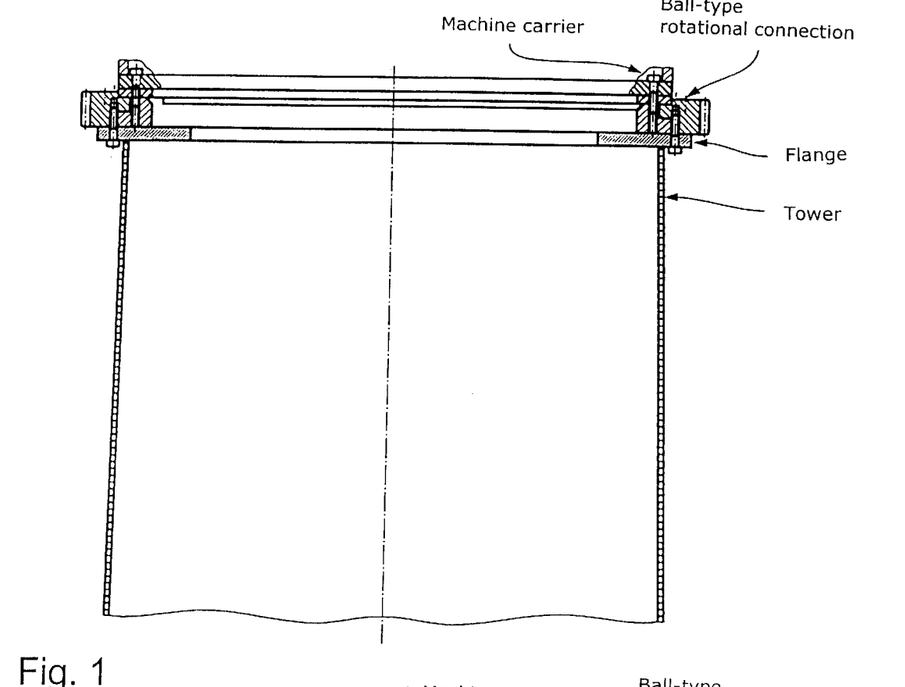
FIG. 1 is a view in longitudinal section through an upper tower portion in accordance with the state of the art.

In conventional wind power installations, of the order of magnitude of an output of 1.0 MW and higher, the towers—usually these involve steel tubes—are of a correspondingly large and heavy nature. A flange is usually provided at the end of the tower, in the case of the steel towers. That flange forms the flat support surface of the tower for receiving an azimuth mounting, in which respect ball-type rotational connections as are known in the general art are predominantly used as the azimuth mounting. This is shown in FIG. 1.

Pre-fabricated L-flanges are frequently welded directly to the end of the tower. The L-flanges are machined so accurately with lathes that the azimuth mounting is then afforded a flat support surface. The azimuth mountings in the case of large wind power installations are of a diameter of between around 1.8 and 4.0 m (or more) and generally are of only very small structural heights of between around 50 mm and 500 mm, preferably between around 100 mm and 200 mm. Therefore those mountings require on both connection sides (tower and tower head of the wind power installation) a very flat, level and stiff connection structure. The azimuth mounting, generally therefore the ball-type rotational connection, is then screwed to the tower head on the mounting side (fitment side) of the wind power installation.

Due to the high inherent weight of the material involved, for example steel, the tower flexes in manufacture and/or in the course of subsequent transportation to the assembly location of the wind power installation. Such flexing phenomena can scarcely be avoided, in particular on uneven roads, in spite of the towers or tower elements being well supported for transportation thereof. Because of the plastic behaviour of steel, the consequence of such flexing is that the intended circular diameter of the end of the tower and of the tower generally has a tendency to change from the ideal circular shape into an oval shape (whale effect). If the circular diameter of the tower is distorted to form an oval, the flange at the end of the tower is also similarly distorted. In that situation the azimuth mounting is stressed and after some period of operation of the wind power installation, flaws and defects occur in the azimuth mounting, which is highly troublesome because repairs can only be carried out on the azimuth mounting, at very high cost and complication.

Therefore the object of the invention is to provide a tower of a wind power installation having a flange for receiving a connection, wherein the tower does not suffer deformation in respect of its cross-section, in particular in the region of the flange, by virtue of the inherent weight of the tower, during manufacture and/or transport.

That object is attained by a tower according to the invention of a wind power installation for carrying a tower head of the wind power installation, wherein the tower has a flange for receiving a connection which is suitable for receiving the tower head of the wind power installation, and the tower is characterised in that a partition or a ring bulkhead is provided in the tower interior at a spacing of preferably between 1.0 m and 7.0 m from the flange, and the partition or the ring bulkhead substantially forms a disc which is connected to the tower wall in the tower interior and which passes through the tower.

The partition or ring bulkhead in the interior of the tower provides that the tower is more difficult to deform in respect of its diameter. For, deformation of the tower diameter in the region of the partition or ring bulkhead can occur only if the ring bulkhead or partition is deformed at the same time. The partition or ring bulkhead is preferably disposed in the proximity of the flange, experience has shown that a spacing of between 1.0 m and 7.0 m is to be preferred, so that the tower diameter is stable in the region of the flange. This therefore ensures that the flange does not suffer deformation during transportation and/or manufacture of the tower.

In accordance with an embodiment a rotary mounting is used as the connection between the tower head and the tower.

The rotary mounting makes it possible for the tower head to rotate relative to the tower. In that way it is possible for the rotors of the wind power installation, which are fixed on the tower head, to be optimally oriented in relation to the wind.

An advantageous design configuration of the invention is achieved by the provision of an opening in the centre of the partition or ring bulkhead.

Articles or people can be conveyed through that opening for example by means of an elevator in the interior of the tower in the erected condition. In particular in the erection procedure or when carrying out repair operations on the wind power installation, it is frequently essential for fitters or specialist personnel with the appropriate tools to pass through the interior of the tower to the end thereof.

In accordance with a further advantageous configuration of the invention, the partition or ring bulkhead is arranged at a spacing of between 1.5 m and 3.0 m, preferably at 2.0 m, from the flange.

The partition or the ring bulkhead therefore not only affords the advantage that it ensures that the azimuth mounting enjoys a completely flat support surface, but at the same time it can also serve as a mounting platform if the tower of the wind power installation, after erection, is to receive the tower head, that is to say the pod, in other words the machine carrier of the wind power installation with the generator and the rotor. For that purpose it is necessary for fitter operatives to move the machine carrier from the interior to the end of the tower and to carry out operating procedures on the machine carrier. The partition or bulkhead according to the invention affords the fitters a safe and secure working platform which can also always be used again in subsequent working operations and which then no longer has to be set up in position.

In accordance with a development of the invention there are provided further partitions or ring bulkheads in the interior of the tower, which each substantially form a disc which is connected to the tower wall in the tower interior and passes through the tower.

The plasticity of the tower is reduced in the region of the additional partitions or bulkheads, with each further partition or ring bulkhead. Accordingly, the provision of further partitions or ring bulkheads in the tower interior affords the advantage that the ideal cross-sectional shape of the tower can be maintained over wide regions of the tower.

An embodiment of the invention is described in greater detail hereinafter and illustrated in the drawing in which.

The view in longitudinal section illustrated in FIG. 1 shows a tower portion in accordance with the state of the art, which includes a tubular tower, a flange, a ball-type rotational connection and a machine carrier. The tubular tower is of a circular cross-section. The flange for receiving the ball-type rotational connection is illustrated at the upper end of the tower. The flange is an annular disc which is welded on the end of the tower and the centre point of which is on the longitudinal axis of the tubular tower. The disc-shaped flange projects beyond the tower wall. The top side of the flange has a flat support surface on which the ball-type rotational connection lies and to which the ball-type rotational connection is secured. The machine carrier is mounted on the ball-type rotational connection rotatably about the longitudinal axis of the tower.

Figure 2:
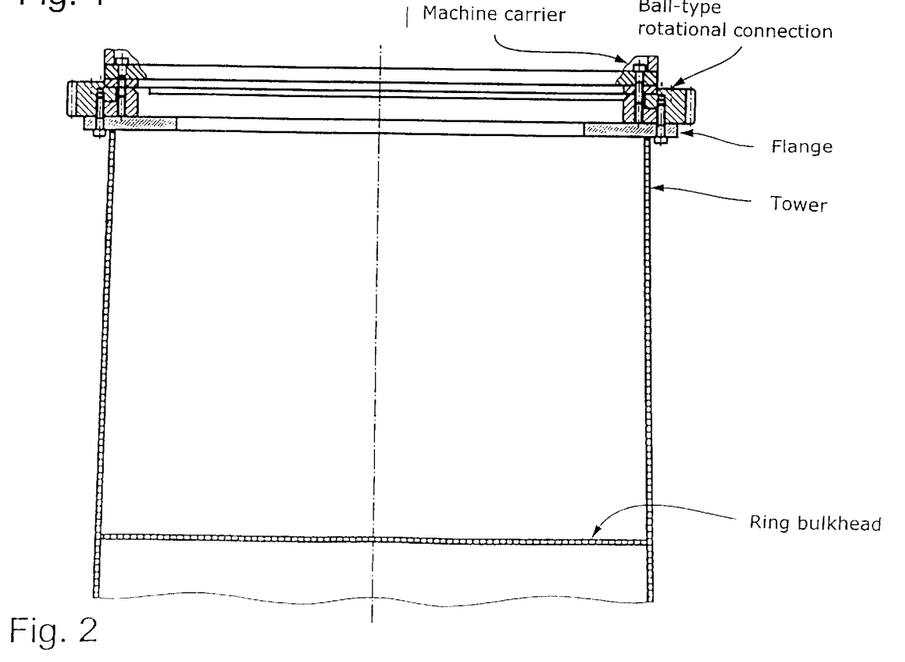
FIG. 2 is a longitudinal section through an upper tower portion in accordance with the embodiment of the present invention.

The tower portion according to the invention as shown in FIG. 2 also has a flange, a ball-type rotational connection and a machine carrier. The arrangement of those elements corresponds to the arrangement in accordance with the state of the art, as shown in FIG. 1. The upper tower portion comprises an azimuth flange and a piece of tower of a length of between about 3.0 m and 10.0 m, preferably between 3.0 m and 4.0 m. That tower portion has an additional partition or ring bulkhead at a spacing of between about 1.50 m and 3.0 m, preferably about 2.0 m, from the azimuth flange. This involves a circular round disc of steel which is welded from the interior into the tower section and divides the tower interior into two regions. Thereafter the tower section unit is machined at the flange. That ensures that the azimuth mounting always has a flat support surface.

Figure 3:
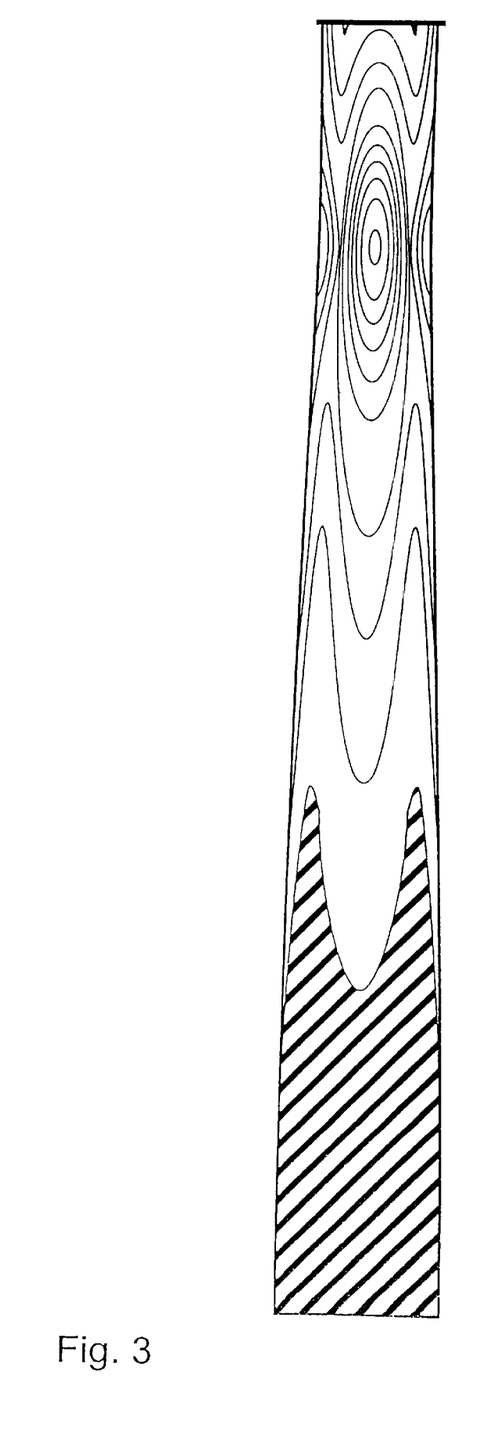
FIGS. 3, 4 and 5 show the deformation of a tower in accordance with the state of the art.
Figure 4:
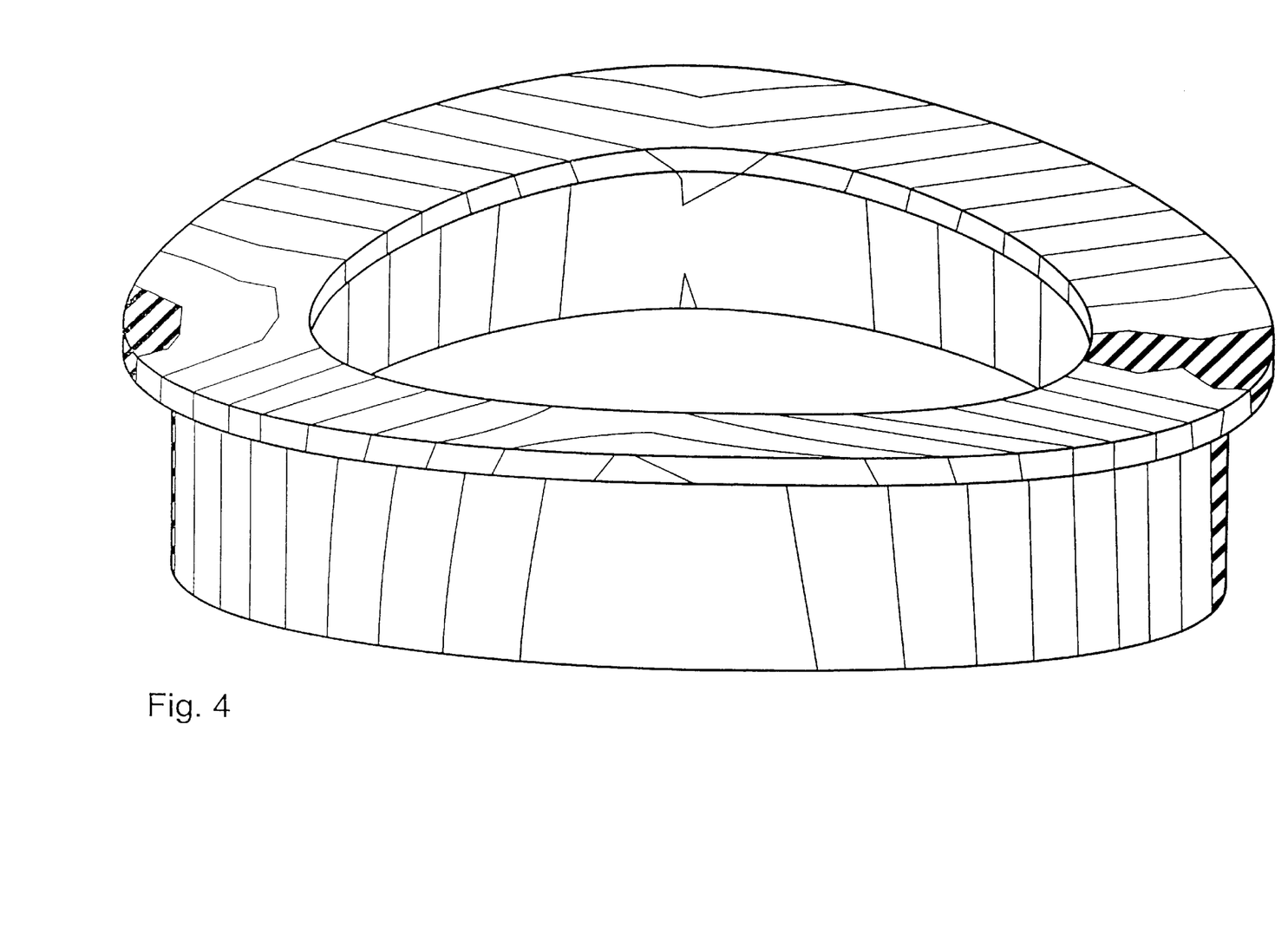
Figure 5:
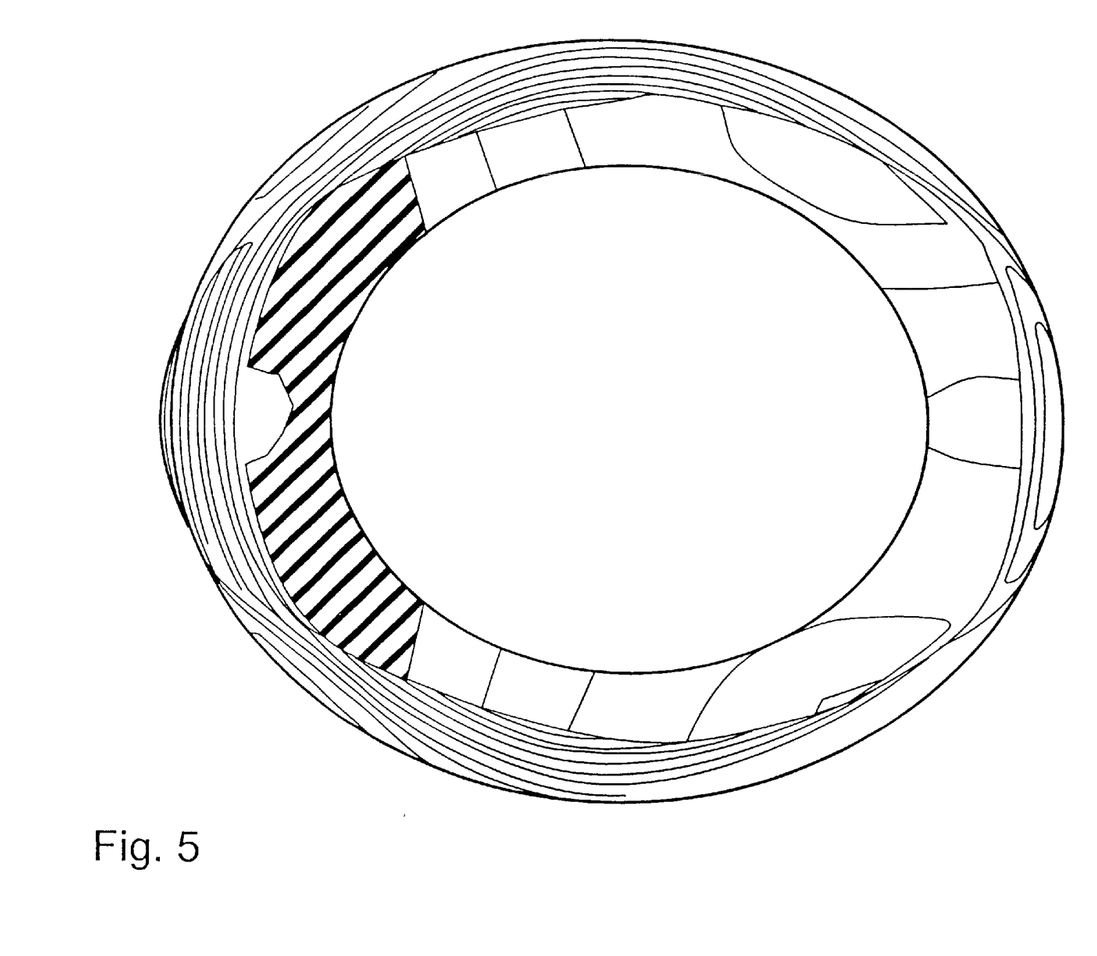
Figure 6:
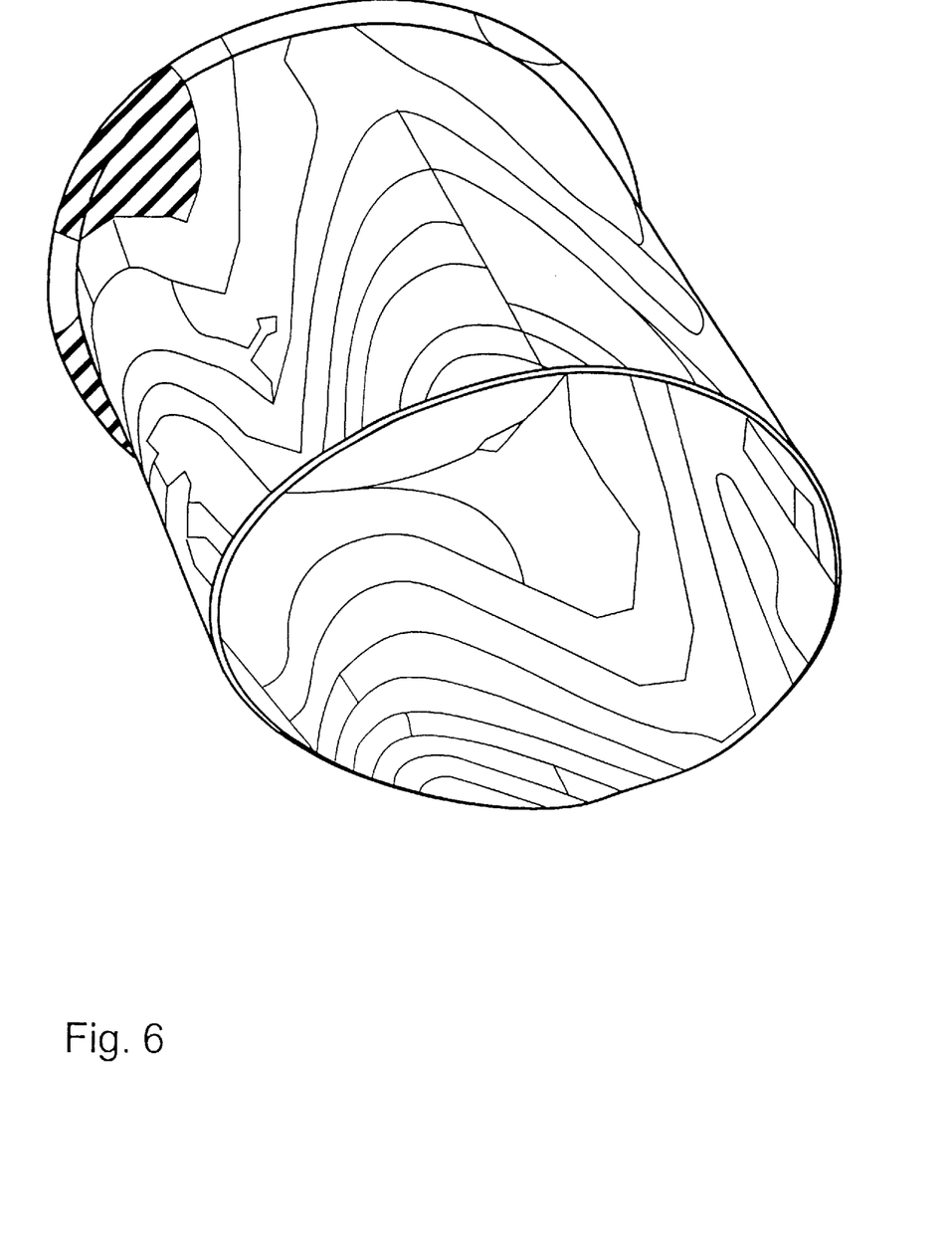
FIGS. 6 to 11 show the deformation of a tower in accordance with the embodiment of the invention.
Figure 7:
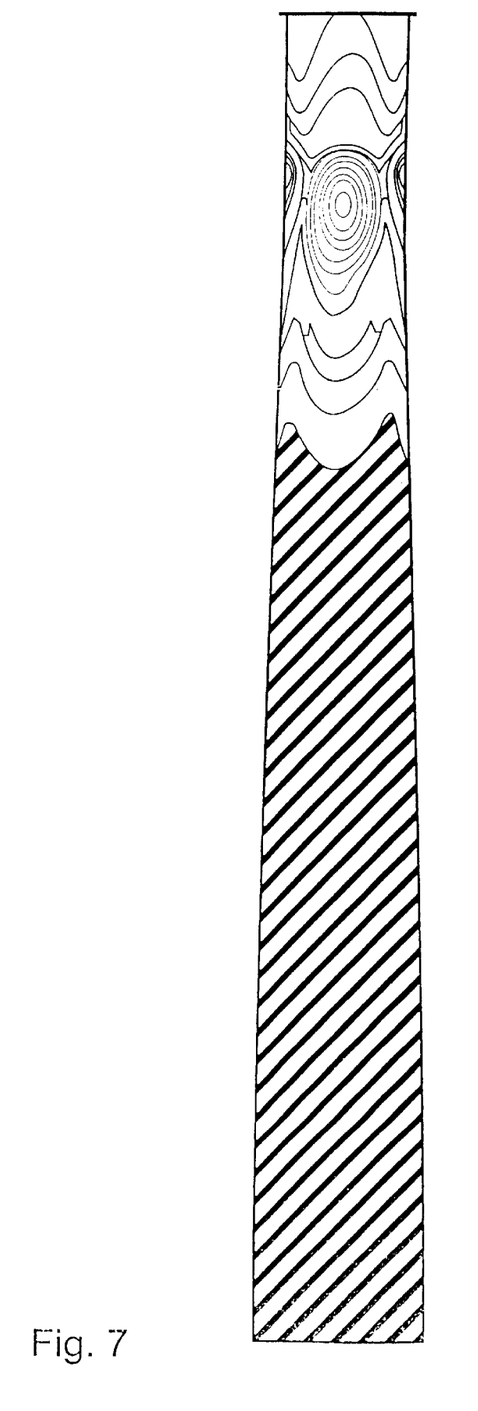
Figure 8:
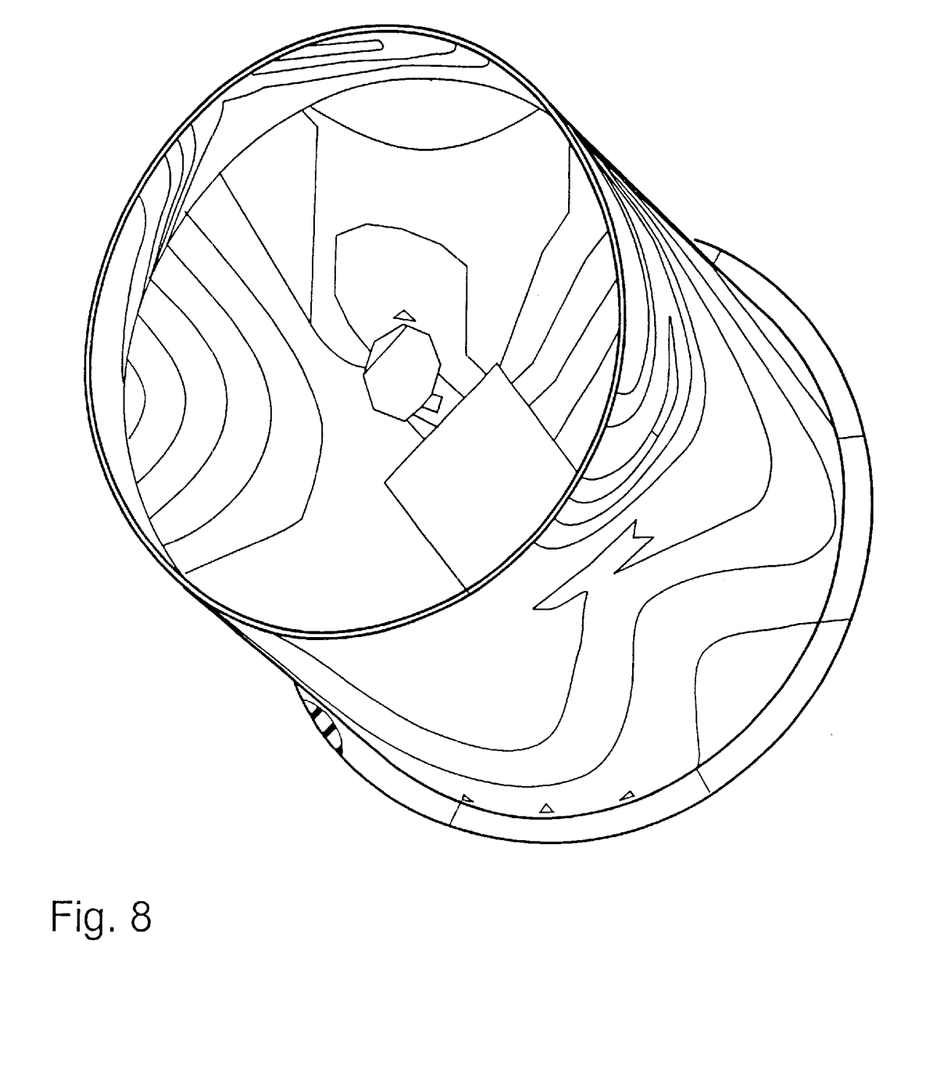
Figure 9:
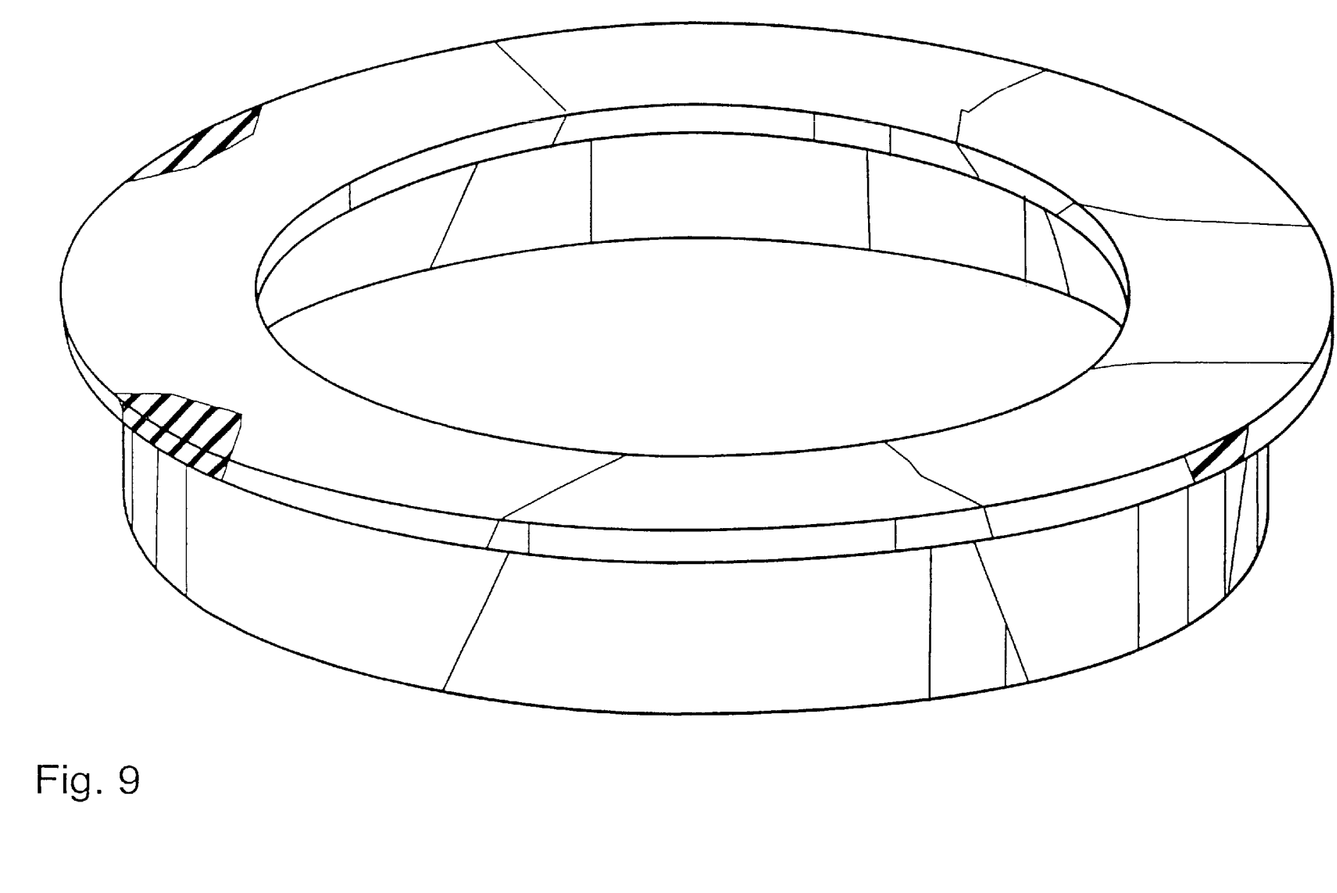
Figure 10:
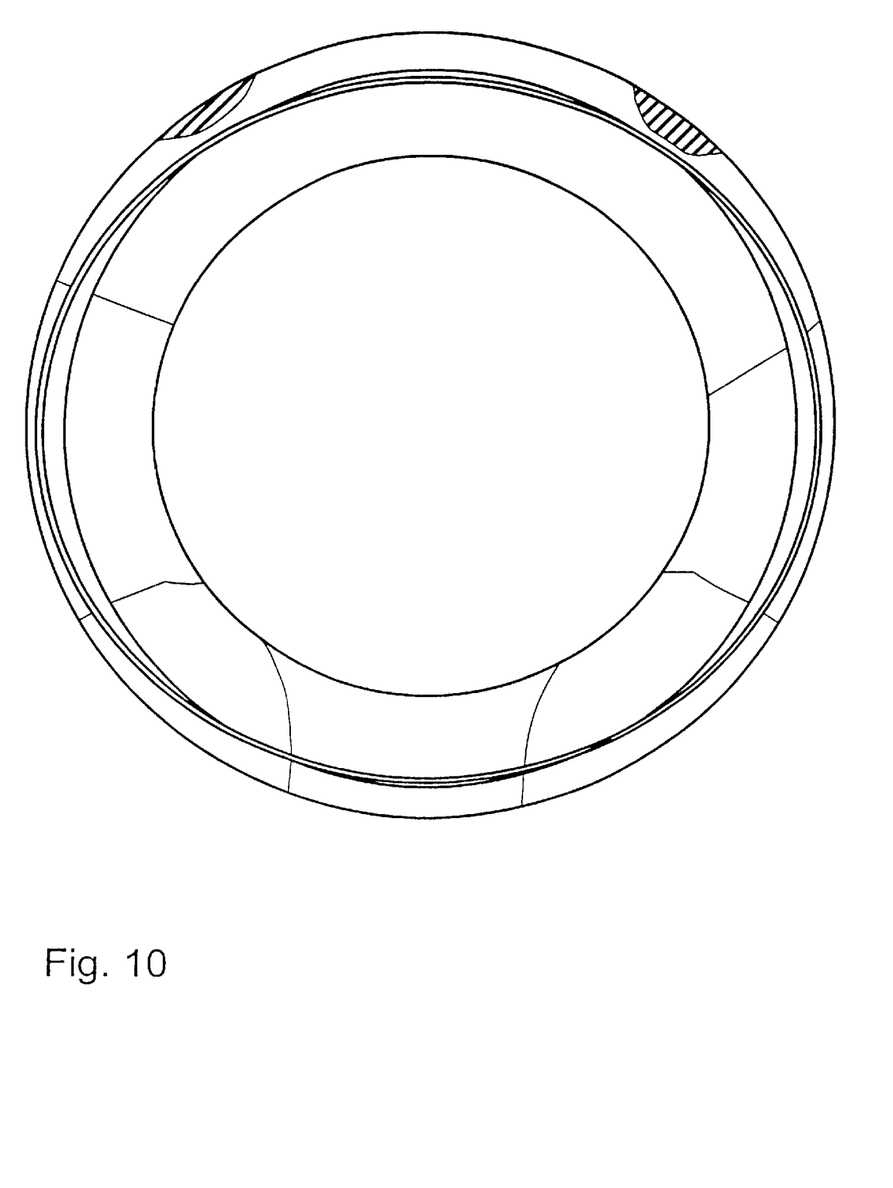
Figure 11:
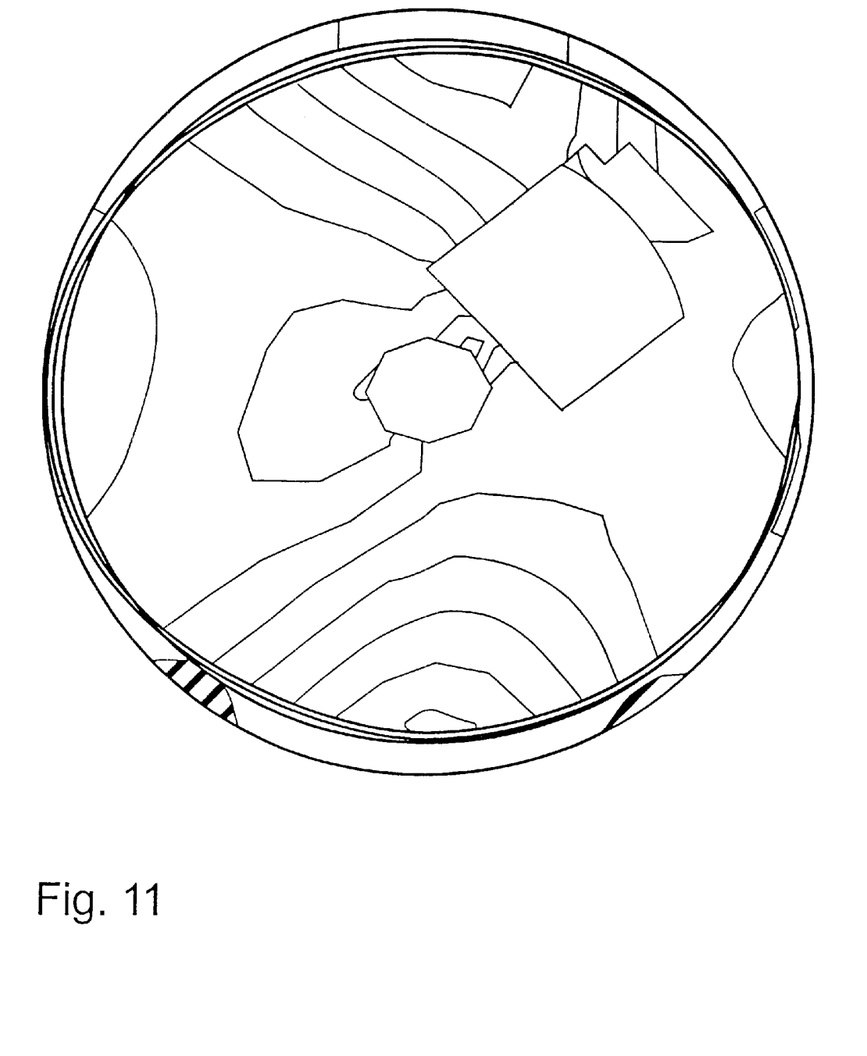

The deformation of a tower in accordance with the state of the art, as shown in FIGS. 3 to 5, is markedly different from the deformation of the tower in accordance with the embodiment of the invention, which is shown in FIGS. 6 to 11. The degree of deformation is indicated by the brightness of the illustrated tower surface. In other words, the black region is undeformed while the white regions exhibit maximum deformation. Comparison for example of FIGS. 3 and 6 will make it clear that the partition fitted in the tower in FIG. 6 provides that deformation of the tower is minimised. For, the region of the tower which is coloured black in FIG. 6 is markedly greater than the region of the tower which is coloured black in FIG. 3. FIGS. 5 and 10 show the end of a tower in accordance with the state of the art and a tower in accordance with the invention, in cross-section. The end of the tower in FIG. 10 is of a substantially circular round cross-section and is therefore scarcely deformed. The end of the tower in FIG. 5 in contrast markedly exhibits an oval shape.

What is claimed is:

1. A wind power installation having a tower head of the wind power installation, comprising:
    a tower for supporting the tower head, the tower having an interior and a flange for receiving a connection that is suitable for receiving the tower head of the wind power installation; and
    a ring bulkhead in the tower interior at a spacing of between 1.0 m and 7.0 m from the flange, wherein the ring bulkhead substantially forms a disc that is connected to an interior wall of the tower.

2. The wind power installation according to claim 1 wherein the connection is a rotary mounting.

3. The wind power installation according to claim 1 wherein there is an opening in the center of the ring bulkhead.

4. The wind power installation according to claim 1, wherein the ring bulkhead on is arranged at a spacing of between 1.5 m and 3.0 m from the flange.

5. The wind power installation according to claim 1 further comprising more than one ring bulkhead in the interior of the tower, which each substantially form a disc that is connected to an interior wall in the tower.

6. The wind power installation of claim 4, wherein the ring bulkhead is arranged 2.0 m from the flange.

* * * * *